No. 766,781.        Patented August 2, 1904.

UNITED STATES PATENT OFFICE.

MAXIMILIAN TOCH, OF NEW YORK, N. Y.

COATING OR LINING MATERIAL FOR METAL OBJECTS.

SPECIFICATION forming part of Letters Patent No. 766,781, dated August 2, 1904.

Original application filed March 21, 1903, Serial No. 148,928. Divided and this application filed May 6, 1903. Serial No. 155,865.

(No specimens.)

*To all whom it may concern:*

Be it known that I, MAXIMILIAN TOCH, a citizen of the United States, and a resident of Manhattan, New York county, city and State of New York, have invented certain Improvements in Coating or Lining Materials for Metal Objects for the Purpose of Rendering Them Proof Against Atmospheric Influences, of which the following is a specification.

The present application, which is a divisional application from my original application, Serial No. 148,928, filed March 21, 1903, is designed to cover the coating and lining material.

The object of my invention is to provide a lining or coating for metallic objects—such as steel beams, iron girders, hulls of ships, inside and out, coal-cars, structural iron, &c.—which are exposed to atmospheric influences and are destroyed or injured by them.

Hitherto cement, under which designation I understand any substance which mixed with water gives a mortar setting solidly under water or in the air, could not be applied to any metal surface. All the attempts to coat or line iron with cement in order to protect the metal against the injurious influence of the atmosphere were unsuccessful. The coat or lining applied to the metal would not stick to the latter, but peeled, dusted, or rubbed off after a short period. I have now found a cement which can be applied on metal in the form of a thin film or coat. The metal coated or lined with this cement resists the action of the atmosphere permanently. The coat or lining produced by this cement adheres firmly to the metal and does not break, dust, or peel off. The cement which I use for this purpose may consist of an ordinary compound of carbonate of calcium and silicate of aluminium, to which I add silica, carbonate of magnesium, calcium oxid, and animal albumen. The finished mass is then mixed with water and applied to the metal surface.

In order to carry out my process practically, I may proceed as follows: Seventy pounds of cement from which as much iron is removed as possible is mixed with ten pounds of silica, ten pounds of carbonate of magnesium, six pounds of calcium oxid, and five pounds of animal albumen. The powder is thoroughly mixed in a ball-mill, into which a current of air freed from moisture and carbonic acid is introduced. Six pounds of the uniform mixture are then added to so much water that one gallon of liquid is obtained. The liquid is then applied to the metal in such a manner that it forms on it a thin lining or coat which protects the metal against the injurious influence of the atmosphere.

The essential ingredients of the metal-protecting compound are cement and calcium albuminate. In the compound above described the calcium oxid and albumen unite to form calcium albuminate. The silica and carbonate of magnesium are believed to be diluents, performing much the same function as that performed by sand used in the ordinary preparation of cement for building purposes.

Although I have above described an example by which the cement can be obtained which is applied to the metal in order to accomplish my invention, nevertheless I do not wish to be understood as thereby excluding equivalents for the ingredients. It is probable that substitutes may be employed for the ingredients without departing from the broad scope of the invention intended to be secured hereby, and while I have explained what I believe to be the functions of the ingredients I do not desire to be limited by such explanations, since other functions may be involved.

I have also above directed to free cement as much as possible from iron, which is almost always found in the ordinary cement. This is advisable, for the reason that the iron present, acting as a carrier of oyxgen, tends to facilitate oxidation of the metal covered by it.

In directing the use of cement in the above process I mean by the term "cement" any substance which mixed with water gives a mortar setting solidly under water or in the air. This of course also includes the pure synthetical cement—a compound of carbonate of calcium in silicate of aluminium.

Although I include any metal object which is affected by the influence of the air and moisture in my invention, I especially wish to refer to structural iron and steel, which by my invention are protected especially against rust, and are thus preserved indefinitely. All previous methods of accomplishing this object— such as painting, varnishing, tarring, &c.— have been unsuccessful.

Having now described my invention, what I claim is—

1. A protective compound containing cement and calcium albuminate, substantially as described.

2. A protective compound containing cement to which has been added albumen and calcium oxid, substantially as described.

3. A protective compound formed by mixing cement, silica, carbonate of magnesium, calcium oxid and albumen, substantially as described.

4. A protective compound containing cement free from iron, and calcium albuminate, substantially as described.

5. A protective compound formed by mixing by weight seventy parts of cement from which the iron has been removed as much as possible, ten parts of silica, ten parts of carbonate of magnesium, six parts of calcium oxid, and five parts of albumen, and adding sufficient water to make one gallon of liquid for each six pounds of the mixture, substantially as described.

In testimony whereof I have signed my name in the presence of two subscribing witnesses.

MAXIMILIAN TOCH.

Witnesses:
HARRY E. BAER,
CHAS. A. LORETZ.